United States Patent [19]

Watson, Jr. et al.

[11] Patent Number: 5,100,925

[45] Date of Patent: Mar. 31, 1992

[54] FLEXIBLE POLYURETHANE FOAM HAVING REDUCED DISCOLORATION DUE TO SCORCH DURING MANUFACTURE

[75] Inventors: Stuart L. Watson, Jr., Midlothian; Joseph R. Graham, Jr., Richmond; David L. Haley, Chester; Myron H. Reinhart, Richmond, all of Va.

[73] Assignee: E. R. Carpenter Company, Inc., Richmond, Va.

[21] Appl. No.: 665,654

[22] Filed: Mar. 7, 1991

[51] Int. Cl.⁵ .............................. C08J 9/12; C08J 9/14
[52] U.S. Cl. ................................ 521/131; 521/99; 521/910
[58] Field of Search .................... 521/99, 131, 910

[56] References Cited

U.S. PATENT DOCUMENTS

| | | | |
|---|---|---|---|
| 3,506,600 | 4/1970 | Zocco et al. | 521/131 |
| 3,876,569 | 4/1975 | Priest et al. | 521/904 |
| 3,978,011 | 8/1976 | Molbert | 521/137 |
| 4,018,724 | 4/1977 | Cobbledick | 521/137 |
| 4,021,319 | 5/1977 | Chaya et al. | 521/163 |
| 4,024,088 | 5/1977 | Godlewski | 521/107 |
| 4,139,501 | 2/1979 | Rudner et al. | 521/118 |
| 4,263,411 | 4/1981 | Bak | 521/129 |
| 4,317,889 | 3/1982 | Pcolinsky, Jr. | 521/131 |
| 4,546,122 | 10/1985 | Radovich et al. | 521/131 |
| 4,785,027 | 11/1988 | Brasington et al. | 521/131 |
| 4,981,880 | 1/1991 | Lehmann et al. | 521/902 |
| 5,032,622 | 7/1991 | Herrington et al. | 521/99 |

*Primary Examiner*—Morton Foelak
*Attorney, Agent, or Firm*—Beveridge, DeGrandi & Weilacher

[57] ABSTRACT

The present invention relates to a method of producing flexible polyurethane foam having reduced discoloration which utilizes low molecular weight alkanes or mixtures thereof as auxiliary blowing agents. More particularly, the present invention relates to the use of auxiliary blowing agents which are linear or branched alkanes having boiling points above −50° C. and below 100° C.

13 Claims, No Drawings

FLEXIBLE POLYURETHANE FOAM HAVING REDUCED DISCOLORATION DUE TO SCORCH DURING MANUFACTURE

BACKGROUND OF THE INVENTION

The present invention relates to a method of producing flexible polyurethane foam having reduced discoloration which utilizes low molecular weight alkanes or mixtures thereof as auxiliary blowing agents. More particularly, the present invention relates to the use of auxiliary blowing agents which are linear or branched alkanes having boiling points above −50° C. and below 100° C.

Currently, flexible polyurethane foam is the primary resilient cushioning material in commerce. It combines low density and high durability along with the comfort characteristics desired for many uses (e.g., furniture and bedding applications).

The principle reactants for the manufacture of flexible polyurethane foam are polyol, polyisocyanate, and water. Water reacts with a portion of the polyisocyanate to form carbon dioxide which is the principal blowing agent. To prepare some flexible urethane foams having a specific softness and low density, an auxiliary blowing agent is sometimes required. Such auxiliary blowing agents are characterized as relatively inert liquids at room temperature and which have low boiling points.

The premier auxiliary blowing agent has previously been trichlorofluoromethane, also known as CFC-11. However, regulatory pressures due to the recognition of the possibility of significant ozone depletion in the upper atmosphere have caused essentially a phase-out of the use of CFC-11 and have led to a search for alternatives.

In addition, discoloration of polyurethane foam slabs has been a chronic industry problem. The problem has been attributed to the high exotherm of the foaming reaction. Contributions to the resolution of the discoloration problem have come from, for example, addition of and improvement to inhibitors in the polyols and changes to additive flame retardant chemical structures. However, for certain polyurethane foam grades, particularly those utilizing relatively high levels of reactant water, and relatively low levels of auxiliary blowing agent, the foam discoloration problem has remained.

The search for alternatives to CFC-11 has shown that other auxiliary blowing agents are useful, with the leading candidates being dichloromethane and 1,1,1-trichloroethane. Unfortunately, the use of dichloromethane and 1,1,1-trichloroethane as auxiliary blowing agents has also been seriously questioned. The use of dichloromethane has been questioned because of health concerns while the use of 1,1,1-trichloroethane has been questioned because of the degree of upper atmosphere ozone depletion.

In our search for alternative auxiliary blowing agents, we have found several liquids which demonstrate initial feasibility. These alternatives include ketones, esters, and alkanes which have limited reactivity with the foaming ingredients of polyurethane yet have sufficiently low boiling points to allow gas formation and density reduction of the polyurethane foam. Considerable prior art exists in the preparation of flexible urethane foam utilizing hydrocarbon blowing agents. U.S. Pat. No. 3,506,600 discloses the use of lower molecular weight alkanes and mixtures thereof as foaming agents for polyurethane foam. Similar discloses are given in U.S. Pat. Nos. 3,650,993; 4,048,102; 4,317,889; 4,334,031; 4,546,122; and 4,785,027. However, in none of these patents has there been the reported use nor recognition of the specific benefits of the hydrocarbon auxiliary blowing agents for reduced discoloration.

SUMMARY OF THE INVENTION

An object of the present invention is to provide a method of producing flexible polyurethane foam having reduced discoloration. Unexpectedly, we have discovered that the class of materials called alkanes yields polyurethane foams which have very low levels of thermally-induced discoloration or scorch.

DETAILED DESCRIPTION OF THE INVENTION

The present invention utilizes low molecular weight alkanes or mixtures thereof as auxiliary blowing agents in the preparation of low density, soft, resilient flexible urethane foam having reduced discoloration or scorch. More particularly, the present invention relates to the use of auxiliary blowing agents which are linear or branched alkanes having boiling points (BP) above −50° C. and below 100° C. at atmospheric pressure, especially those materials having a boiling point below 65° C. Such alkanes include, but are not limited to, the following: propane (BP = −42° C.), isobutane (BP = −13° C.), butane (BP = −0.5° C.), n-pentane, n-hexane, n-heptane, isopentane, isohexane, 3-methylpentane, 2,2-dimethylpentane, and 2,3-dimethylpentane.

The art of preparing flexible polyurethane foams is well known. For example, texts are available such as *Polyurethane Handbook* (G. Oertel, Hanser, Munich, 1985) and *The ICI Polyurethane Book* (G. Woods, Wiley, Chicester, 1987); both incorporated by reference. See also U.S. Pat. No. 4,546,122 which is incorporated by reference. In brief, polyether polyols initiated from glycerine, propylene oxide and ethylene oxide are employed along with a slight excess of stoichiometric amount of toluene diisocyanate, with an 80/20 blend of the 2,4- and 2,6-isomers being most commonly utilized. Other minor ingredients include water, auxiliary blowing agent, amine catalyst, tin catalyst, and silicone surfactant. It is not anticipated that the present invention is unique to the presence of specific ingredients with the exception of the auxiliary blowing agent. Neither should th present invention be specific to any certain type of foaming equipment. Various types of foam equipment are described in the aforementioned texts.

The foam discoloration problem of polyurethane foam does not occur with all grades of foam and does not occur at all times. The strongest correlations known in the art indicate that the hot months of the year coupled with foams made from higher levels of reactant water are most prone to the discoloration. More specifically, scorch appears to be most accentuated in flexible polyurethane foams prepared using 3.5 parts or more water and 8 parts or less of auxiliary blowing agent per 100 parts polyol for foams not containing additive flame retardants. The apparent reason for this region of formulation concern results from the high exotherm of the water-isocyanate reaction and the cooling effect of high levels of auxiliary blowing agent. Applicants have unexpectedly discovered that use of the auxiliary blowing agents of the present invention reduces discoloration or scorch in the manufacture of polyurethane foam.

The following examples demonstrate the reduced discoloration from using the hydrocarbon auxiliary blowing agents of the present invention.

EXAMPLES

A series of small laboratory foams were prepared to detail the specific formulation adjustments needed to compare a series of auxiliary blowing agents. These formulations were then scaled to production and full slabs of size 44"×7'×50' were made using Maxfoam equipment as depicted by Unifoam A. G., Glarus, Switzerland. After 24 hours storage for curing and cooling, the slabs were cut at the 25' mark and evaluated for discoloration. The formulations and results are presented in Table I.

Subsequently, polyol was placed in a pressure vessel and held under pressure with butane. After equilibrium was reached, the pressure was reduced to atmosphere. The residual polyol was found to contain 4.81% volatiles. This material was used on production equipment as previously described, and the results are also given in Table I.

It is expected that other alkanes with a boiling point above −50° C. and below 100° C. will produce similar results.

Further variations and modifications of the invention will become apparent to those skilled in the art from the foregoing and are intended to be encompassed by the claims appended hereto.

TABLE I

|  | Comparative Examples | | | | | |
| --- | --- | --- | --- | --- | --- | --- |
|  | MC[1] | P[1] | IP[1] | A[1] | MF[1] | B[1] |
| Carpol TM GP-3005[2] | 100.00 | — | — | — | — | — |
| 80/20 TDI[3] | 58.67 | — | — | — | — | 59.51 |
| Water | 4.70 | — | — | — | — | 4.75 |
| L-5770[4] | 1.25 | — | — | — | — | 1.15 |
| Stannous Octoate | 0.32 | 0.30 | 0.30 | 0.36 | 0.34 | 0.21 |
| Triethylenediamide (33% in dipropylene glycol) | 0.60 | 0.70 | 0.70 | 0.60 | 0.60 | 0.70 |
| Auxiliary Blowing agent | 2.90 | 1.40 | 1.40 | 2.50 | 2.60 | 4.81 |
| Average Density, pcf | 1.24 | 1.19 | 1.23 | 1.17 | 1.16 | 0.76 |
| Average 25% IFD[5], lbs | 41.6 | 39.2 | 42.1 | 42.2 | 34.7 | 41.1 |
| Average Support Factor[6] | 1.94 | 1.94 | 1.95 | 1.94 | 1.95 | 1.98 |
| Porosity[7], % | 62 | 66 | 60 | 55 | 47 | 30 |
| Discoloration[8] | dark | very light | very light | mod. dark | mod. erate | lght |

[1]Auxiliary blowing agents MC = methylene chloride, P = pentane, IP = isopentane, A = acetone, MF = methyl formate, B = butane
[2]3000 molecular weight polyol available from Carpenter Chemical Company.
[3]80%/20% mixture of 2,4 - and 2,6 - toluene diisocyanate
[4]Silicone surfactant available from Union Carbide Corp.
[5]Determined on 4" samples in accordance with ASTM D 3574.
[6]65% IFD divided by 25% IFD as determined by ASTM D 3574.
[7]Relative determination of air permeability with 0% yielding very low and 100% very high.
[8]Visual rating of the slab core.

What is claimed:

1. A method of preparing low density, soft, resilient flexible polyurethane foam having reduced discoloration or scorch during its manufacture comprising reacting a polyol, a polyisocyanate, water as the primary blowing agent, and an auxiliary blowing agent selected from the group consisting of linear or branched alkanes having boiling points above −50° C. and below 100° C. at atmospheric pressure, and mixtures thereof.

2. The method according to claim 1, wherein said auxiliary blowing agent has a boiling point below 65° C.

3. The method according to claim 1, wherein said auxiliary blowing agent is pentane.

4. The method according to claim 1, wherein said auxiliary blowing agent is isopentane.

5. The method according to claim 1, wherein said auxiliary blowing agent is butane.

6. The method according to claim 1, wherein said auxiliary blowing agent is at least one member of the group consisting of pentane, isopentane, and butane.

7. Flexible polyurethane foam prepared in accordance with claim 1.

8. In the method of preparing low density, soft, resilient flexible polyurethane foam by reacting a polyol, a polyisocyanate, and water as the primary blowing agent, the improvement which comprises reducing discoloration or scorch during manufacture of said polyurethane foam characterized in using an auxiliary blowing agent selected from the group consisting of linear or branched alkanes having boiling points above −50° C. and below 100° C. at atmospheric pressure or mixtures thereof.

9. The method according to claim 9, wherein said auxiliary blowing agent is at least one member of the group consisting of pentane, isopentane, and butane.

10. A method of reducing discoloration or scorch during the manufacture of polyurethane foam comprising reducing the high exotherm of the foaming reaction by using water as the primary blowing agent and an auxiliary blowing agent selected from the group consisting of linear or branched alkanes having boiling points above −50° C. and below 100° C. at atmospheric pressure, or mixtures thereof.

11. The method according to claim 10, wherein said auxiliary blowing agent is at least one member of the group consisting of pentane, isopentane, and butane.

12. A method of forming large blocks of polyurethane foam having reduced discoloration at the center of said blocks due to scorch caused by excessive temperature during the exothermic reaction of a polyol, a polyisocyanate and water as the primary blowing agent comprising using an auxiliary blowing agent selected from the group consisting of linear or branched alkanes having boiling points above −50° C. and below 100° C. at atmospheric pressure or mixtures thereof.

13. The method according to claim 1, wherein said auxiliary blowing agent is at least one member of the group consisting of pentane, isopentane, and butane.

* * * * *